INVENTORS
GEORGE D. LEWIS
DONALD E. DAHLBERG

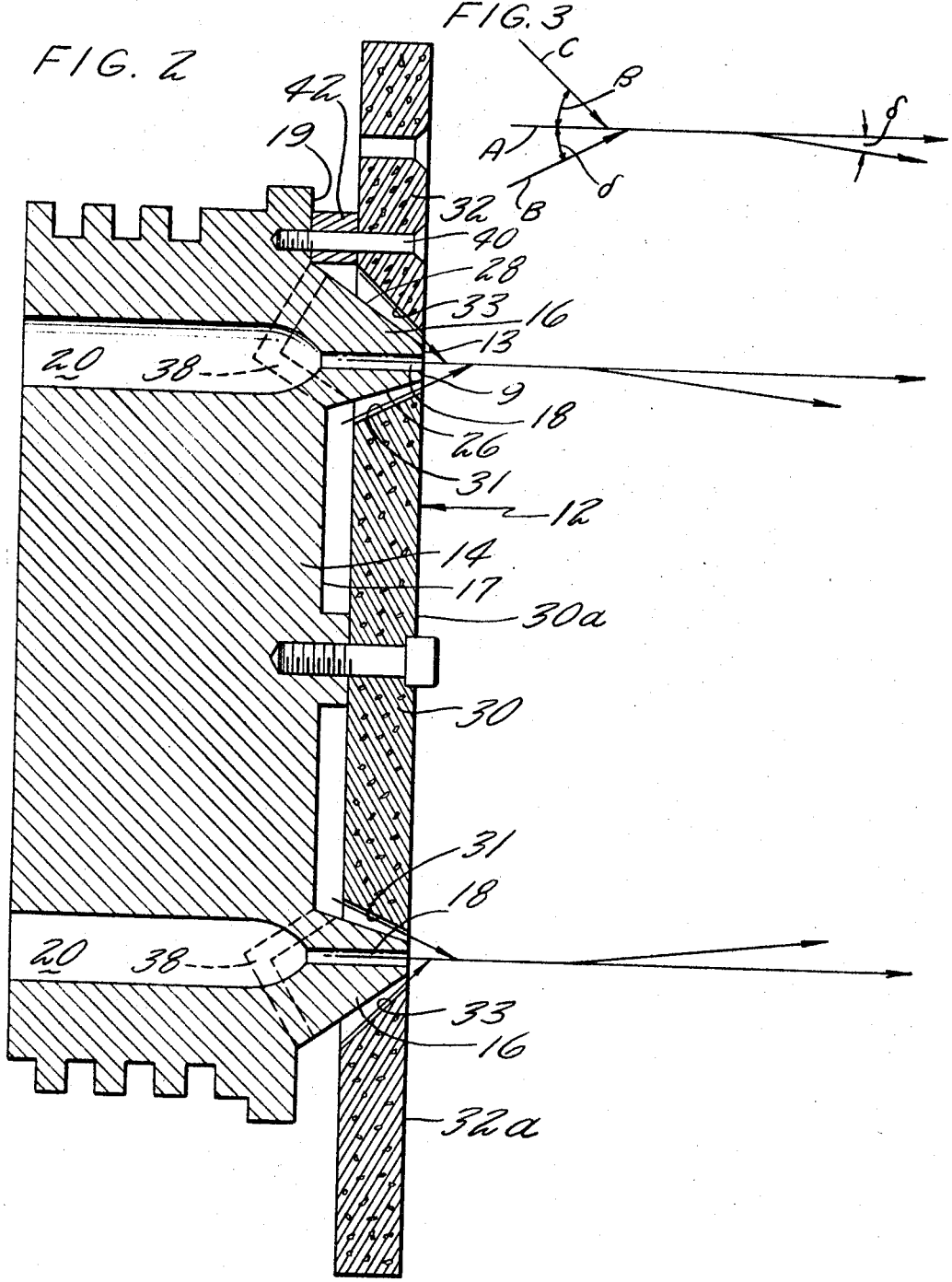

10 Claims

United States Patent Office 3,446,024
Patented May 27, 1969

3,446,024
AXIAL CONCENTRIC SHEET INJECTOR
George D. Lewis and Donald E. Dahlberg, North Palm Beach, Fla., assignors to United Aircraft Corporation, East Hartford, Conn., a corporation of Delaware
Filed Dec. 13, 1965, Ser. No. 514,433
Int. Cl. F02k 9/02
U.S. Cl. 60—258

ABSTRACT OF THE DISCLOSURE

An injector for a rocket having a supply of liquid propellants connected thereto. Said injector providing for the injection of the propellants as annular sheets. One propellant being injected as a cylindrical sheet with an annular sheet of a second propellant being injected one on the outer side of said cylindrical sheet and one on the inner side. Each annular sheet of a second propellant being arranged to intersect said cylindrical sheet at different axial locations within the combustion chamber to deflect said flow in one direction and then the other.

---

This invention relates to an injector for a rocket having means for injecting propellants into a chamber as concentric sheets having variations in angular position due to the other.

An object of this invention is to provide an injector wherein maximum cooling can be obtained on the injector face and on the combustion chamber walls.

Another object of this invention is to provide concentric sheets of propellants injected to provide high efficiency.

A further object of this invention is to provide an injector which can be easily scaled to various size thrust chambers by adding one or more annular injector elements having a common center line.

Another object of this invention is to provide an injector wherein an annular hydrogen sheet is impinged on an annular liquid oxygen sheet from each side at a different angle at different axial locations, such that the central oxygen sheet is deflected first to one side and then back towards the other side.

A further object of this invention is to provide an injector having good propellant distribution.

Other objects and advantages will be apparent from the following specification and drawings.

FIGURE 2 is an enlarged view of the injector shown in FIGURE 1.

FIGURE 3 is a diagrammatic view of the propellant impingement area.

Figure 1:
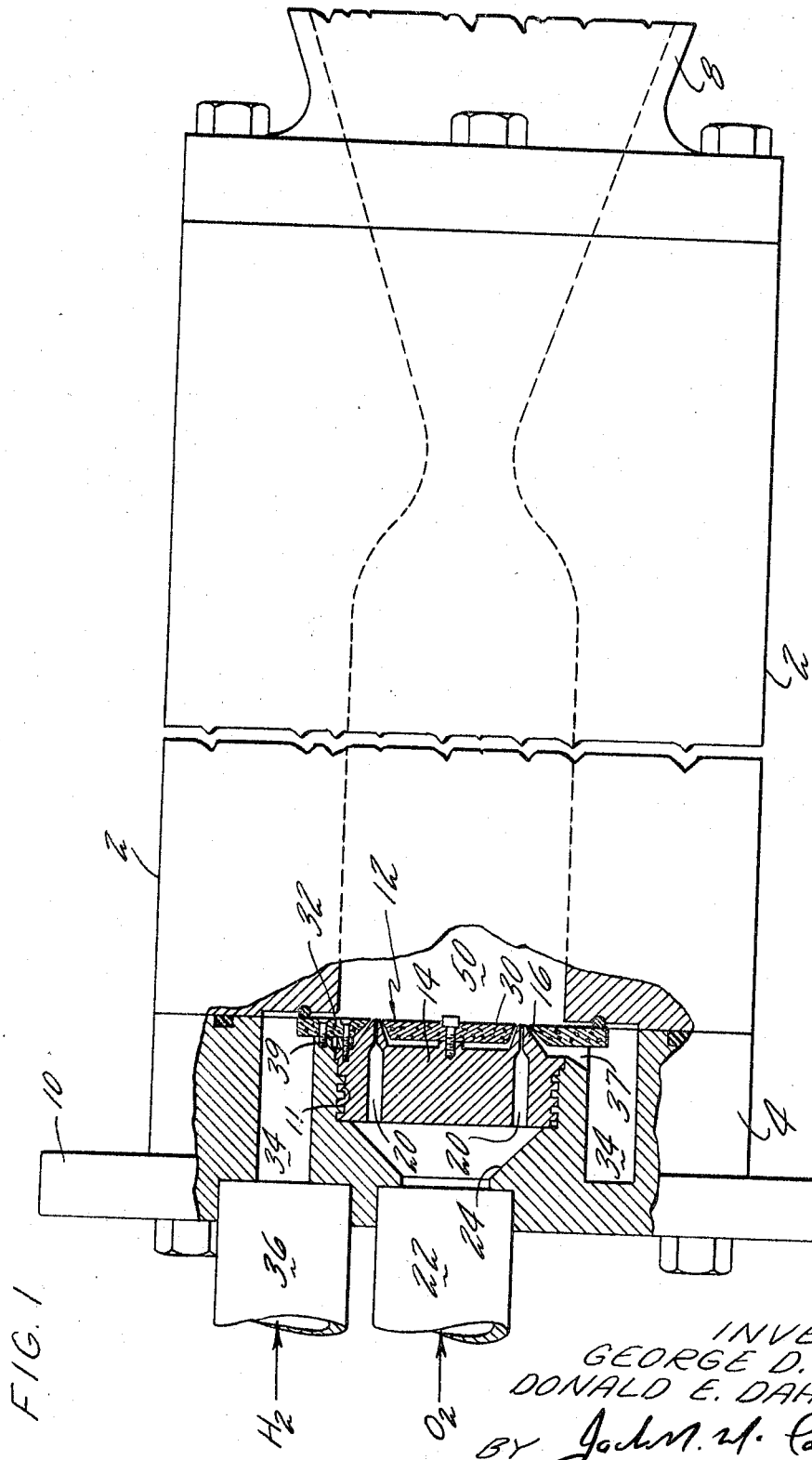
FIGURE 1 is a view of a rocket nozzle and injector, partially in section, showing the injector.

Referring first to FIGURE 1, the rocket has a substantially cylindrical outer wall 2, an end closure member 4, and a nozzle skirt 8. While these elements have been shown bolted together, they can be fixed by other satisfactory means. The end closure member 4 has a flange 10 for attaching it to a vehicle or other body. The center of the inner side of the end closure member 4 has a threaded recess 11 to receive an externally threaded injector element 14. The injector 12 is positioned by having the element 14 threadably secured in the recess of the end closure.

An annular projection 16 having a flat end is formed extending from the inner face of the injector element 14. This projection has an annular slot 18 cut in the flat end thereof. The remainder of the flat end on each side of the slot 18, the inner lip 9 and the outer lip 13 are each made as small as possible to avoid burning. Passageways 20 extend from the other side of the injector element 14 at a number of locations to points adjacent the base of the annular projection 16. Annular slot 18 intersects the ends of the passageways 20 at its inner end. An oxidizer supply is directed to the passageways 20 through a conduit 22 and a passageway 24 located in the closure member 4.

The annular projection 16 is formed having an inner sloping side 26 extending away from the flat slot end forming the annular side of a recessed center 17 in injector element 14 and having an outer sloping side 28 extending away from the slot end forming an annular side meeting a flat outer annular face 19. A porous plate 30 is fixedly positioned in the recessed center, within the annular projection 16, spaced from the bottom and having an annular end 31 formed at a predetermined angle α with the center axis A of the slot 18. The bottom of the plate 30 adjacent the bottom of the recessed center 17 of member 14 is fixedly spaced therefrom a distance approximately equal to the space between the end of the plate and the annular projection 16 at their inner ends. Spacer members can be placed as needed between the plate 30 and the bottom of the recessed center, or abutments can extend from either the plate or bottom of the center as shown, with holding bolts extending between the plate and bottom.

An annular porous plate 32 is fixedly positioned around the annular projection 16 spaced from the face 19 and having an annular end 33 formed at a predetermined angle β with the center axis A of the slot 18. The annular plate 32 is fixedly secured to the closure member 14 by a plurality of bolts 40 and spaced therefrom by spacers 42. Plate 32 is also fixed to spacer projections 39 of the member 4 which form openings 37 therebetween which serves as passages for a purpose to be hereinafter described.

The inner sloping side 26 of the projection 16 forms an annular passageway with the annular end 31 of the porous plate 30. The cross section of this passageway increases slightly in size from the injection end at the face of the injector to the inner end connected to the space between the bottom of the recess center and the bottom of the plate 30. The propellant passing through this annular passageway is directed into the chamber 50 at a predetermined angle α. This angle is shown in FIGURE 3 as approximately 25° (see arrow B). The outer sloping side 28 of the projection 16 forms an annular passageway with the annular end 33 of the porous plate 32. The cross section of this passageway increases slightly in size from the injection end at the face of the injector to the inner end connected to the space between the flat face 19 and the bottom of the plate 32. A propellant passing through this annular passageway is directed into the chamber 50 at a predetermined angle β. This angle is shown in FIGURE 3 as approximately 45° (see arrow C).

The inwardly facing surface 30a of the porous plate 30, the flat end of projection 16, and the inwardly facing surface 32a of the annular plate 32, all lie in a plane with the end of closure member 4 which abuts the cylindrical wall 2. An annular chamber 34 in the closure member 4 is connected to the space between the annular plate 32 and member 14 by the openings 37 referred to above.

Passageways 38 connect the space between plate 30 and member 14 to the space between the annular plate 32 and member 14. A hydrogen supply is directed to the annular chamber 34 through conduit 36. It is then delivered to the space between the annular plate 32 and the member 14 through openings 37 which extend around the closure member 4, and in turn, to the space between the plate 30 and member 14 through passageways 38. The porous material of the face of the injector head provides for cooling thereof.

In one test, a configuration was run in which the annular slot 18 had a width of .031″ and the projection 16 was made of copper. In this test, the width of the annular slot formed between the edge of sloping side 26 and the edge annular end 31 was .01″ and the slot between the edge of sloping side 28 and the edge end 33 had a width of .011″. The width of the inner lip 9 was 0.020″ and the width of the outer lip 13 was 0.020″. The angle $\beta$ was 45° and the angle $\alpha$ was 25°.

It is to be understood that the invention is not limited to the specific description above or specific figures shown, but may be used in other ways without departure from the spirit as defined by the following claims.

We claim:
1. An engine having in combination, a combustion chamber, and an injector for injecting propellants into said chamber, said injector having an injector face with a first annular slot, means for injecting a cylindrical sheet of propellant having an axis through said first annular slot into said combustion chamber, a second annular slot located on the face of said injector around the first annular slot, a third annular slot located on the face of the injector within the first annular slot, means for directing a second propellant to each of said second and third slots, said second slot being arranged to direct its flow therefrom angularly against the side of the cylindrical sheet of propellant injected from the first annular slot at one axial location to deflect the flow of the cylindrical sheet in one direction with respect to the axis, said third slot being arranged to direct its flow therefrom angularly against the other side of the cylindrical sheet of propellant injected from the first annular slot at a second axial location to deflect the flow in the other direction with respect to the axis.

2. An article as claimed in claim 1 wherein said second slot is arranged to direct its flow therefrom angularly at approximately 45° against the side of the cylindrical sheet of propellant injected from the first annular slot.

3. An article as claimed in claim 1 wherein the third slot is arranged to direct its flow therefrom angularly at approximately 25° against the other side of the cylindrical sheet of propellant injected from the first annular slot.

4. An article as claimed in claim 1 wherein said second slot is arranged to direct its flow therefrom angularly at approximately 45° against the side of the cylindrical sheet of propellant injected from the first annular slot and the third slot is arranged to direct its flow therefrom angularly at approximately 25° against the other side of the cylindrical sheet of propellant injected from the first annular slot.

5. An engine having in combination, a combustion chamber, and an injector for injecting propellants into said chamber, said injector having an injector face through which the propellants are injected into said chamber, said injector face being formed by a solid annular member having a first annular slot therein and a circular porous member fixed within said solid annular member and an annular porous member fixed around said solid annular member, said annular porous member forming a second annular slot with said solid annular member, said circular porous member forming a third annular slot with said solid annular member, means for directing propellant to said slots and behind said porous members, said second and third slots being arranged to direct their flow annularly against the side of the flow ejected from the first annular slot at different axial locations to deflect the flow injected from the first annular slot first in one direction and then in the other.

6. An article as claimed in claim 5 wherein said solid annular member has small lip areas on both sides of the first annular slot facing said chamber.

7. A method of injecting two propellants into a combustion chamber which consists of:
 (a) injecting a cylindrical sheet of a first propellant into said combustion chamber,
 (b) injecting a first sheet of a second propellant into said combustion chamber directed at a first angle against one side of said cylindrical sheet of first propellant to provide a first resultant deflection, and
 (c) injecting a second sheet of the second propellant into said combustion chamber directed at a second angle against the other side of said cylindrical sheet of first propellant at a different axial location to provide a second resultant deflection.

8. A method of injecting two propellants as set forth in claim 7 wherein the first sheet of a second propellant is directed at said first angle against the outer side of said cylindrical sheet of first propellant and the second sheet of the second propellant is directed at said second angle against the inner side of said cylindrical sheet of first propellant.

9. A method of injecting two propellants as set forth in claim 7 wherein said first angle is approximately 45° and the second angle is approximately 25°.

10. A method of injecting two propellants as set forth in claim 8 wherein said first angle is approximately 45° and the second angle is approximately 25°.

References Cited

UNITED STATES PATENTS

| | | | |
|---|---|---|---|
| 2,397,834 | 4/1946 | Bowman | 60—39.74 |
| 2,455,845 | 12/1948 | Wells | 60—244 |
| 2,667,740 | 2/1954 | Goddard | 60—258 |
| 2,868,587 | 1/1959 | Hegmann | 239—422 |
| 3,170,286 | 2/1965 | Stein | 60—267 |

MARTIN P. SCHWADRON, *Primary Examiner.*

D. HART, *Assistant Examiner.*

U.S. Cl. X.R.

60—39.74